(12) United States Patent
Bunnell

(10) Patent No.: US 7,047,521 B2
(45) Date of Patent: May 16, 2006

(54) DYNAMIC INSTRUMENTATION EVENT TRACE SYSTEM AND METHODS

(75) Inventor: Mitchell Bunnell, Livermore, CA (US)

(73) Assignee: LynoxWorks, Inc., San Jose, CA (US)

( * ) Notice: Subject to any disclaimer, the term of this patent is extended or adjusted under 35 U.S.C. 154(b) by 632 days.

(21) Appl. No.: 09/876,675

(22) Filed: Jun. 7, 2001

(65) Prior Publication Data

US 2002/0199172 A1    Dec. 26, 2002

(51) Int. Cl.
*G06F 9/44*    (2006.01)

(52) U.S. Cl. .......................... 717/130; 717/128

(58) Field of Classification Search ............... 717/128, 717/130
See application file for complete search history.

(56) References Cited

U.S. PATENT DOCUMENTS

| | | | |
|---|---|---|---|
| 5,528,753 A * | 6/1996 | Fortin | 714/35 |
| 5,732,273 A * | 3/1998 | Srivastava et al. | 717/128 |
| 5,872,909 A | 2/1999 | Wilner et al. | |
| 5,996,092 A * | 11/1999 | Augsburg et al. | 714/38 |
| 6,023,561 A * | 2/2000 | Mann | 714/45 |
| 6,026,236 A * | 2/2000 | Fortin et al. | 717/130 |
| 6,047,390 A * | 4/2000 | Butt et al. | 714/43 |
| 6,164,841 A * | 12/2000 | Mattson et al. | 716/1 |
| 6,173,395 B1* | 1/2001 | Wisor et al. | 712/236 |
| 6,216,143 B1* | 4/2001 | Ryan et al. | 717/128 |
| 6,263,488 B1* | 7/2001 | Fortin et al. | 717/127 |
| 6,351,845 B1* | 2/2002 | Hinker et al. | 717/128 |
| 6,507,805 B1* | 1/2003 | Gordon et al. | 717/128 |

* cited by examiner

*Primary Examiner*—Wei Y. Zhen
*Assistant Examiner*—Qamrun Nahar
(74) *Attorney, Agent, or Firm*—New Tech Law; Gerald B Rosenberg

(57) ABSTRACT

Program code loaded for execution by a computer can be dynamically instrumented to collect event data by inserting an instruction at a trace point within the program code as loaded in a memory space of a computer, where the trace point corresponds to the beginning of a predefined function of the program selected for event tracing. The instruction provides for the direction of the execution of said computer to a function proxy routine, which includes a call to an instance of the predefined function. Event data is collected in connection with the calling of the instance of the predefined function.

19 Claims, 5 Drawing Sheets

DYNAMIC INSTRUMENTATION EVENT TRACE SYSTEM AND METHODS

BACKGROUND OF THE INVENTION

1. Field of the Invention

The present invention is generally related to software development tools and environments and, in particular, to an event trace and visualization tool supporting the dynamic instrumentation of target program code and collection of event data with minimal impact on the system behavior of the target program and system.

2. Description of the Related Art

Within software development processes, the specific detection and causal analysis of failure sources in software programs, particularly while executing, is a complex art. Although static analysis of program source code can identify potential problems, the most difficult to analyze failure sources are those that only occur when a target program is being executed in its intended execution environment, and even then only intermittently and unpredictably. Such failure sources most typically occur where the program under analysis must be responsive to real-time events, are subject to resource constrains, or involve complicated interactions between co-executing programs. Therefore, many failure sources may only become apparent when the program is executed under actual operating conditions. Known types of failure sources include unhandled events, unexpected contention, consumption, and exhaustion of program resources, latencies and improper code operations in varied circumstances, and the like.

Software-based trace tools are conventionally used for the detection and analysis of failure sources in executing programs. Such programs typically involve the insertion or instrumentation of the program under analysis with break points used to trigger the collection of information on the executing state of the program. Progressive analysis of the log files containing the collected information then provides a basis for detecting and understanding the cause of failure sources.

There are, however, a number of problems with the effective use of conventional trace tools. One is the effective requirement that the program under analysis be executed on its target hardware and within its normal operating environment. In many cases, the target hardware or operating environment is not suitable for direct software development use. Indeed, the target hardware can be a proprietary platform suitable for an embedded application to a general purpose computer system. Similarly, the target program may be an application program, operating system, device driver, or an embedded control program. Conventionally, then, a separate or development host computer system is employed for the visualization and analysis of data collected by a trace tool.

However, a complicating factor, is that the program under analysis may be any program, ranging from a dedicated program executing on embedded target hardware to the operating system kernel, device driver, or user-level application program executing on a general purpose computer. Where the program under analysis is highly customized or proprietary, or the target hardware is highly specialized, conventionally an equally customized trace tool is used to accommodate the software and hardware constraints of the target hardware and operating environment. The resulting trace tools are therefore unavailing in any generic or alternate environment and inapplicable to the development of generic or alternate programs.

Another problem encountered by conventional trace tools is that their use directly and substantially affects the system behavior of the program under analysis. The incorporation of the trace tool instrumentation and supporting information collection routines will intrude, both in terms of performance and space, on the program under analysis. Performance intrusion refers to the added execution overhead incurred whenever a trace point in the instrumented program code is encountered. Conventionally, performance intrusion is substantial, varying with the total number of potential data collection trace points that are instrumented in the program under analysis. In addition to the added execution time needed to actually perform data collection at a trace point, conventional trace point instrumentation typically also imposes a processing overhead of two unconditional interrupts and execution of the associated interrupt handling to identify the interrupt sources. The performance penalty due to these interrupts is incurred regardless of whether the trace points are functionally active to enable the collection of trace point data.

The first interrupt occurs in response to the execution of a break instruction inserted at the trace point. Where the break instruction is inserted into the binary image of the program under analysis, thus overwriting the byte storage equivalent of the binary break instruction, the overwritten code must be restored and the trace point address re-executed to maintain the proper execution of the program. A second interrupt, typically a single step instruction mode trap, is then required to restore the binary break instruction back to the trace point.

Additional performance intrusions occur as side-effects of using break instructions to establish trace points. Since the binary image of the program under analysis is modified twice in response to execution reaching a trace point, the processor cache typically must be flushed with each modification to ensure that the processor correctly executes the modified image. In turn, these repeated cache flushes may create new or mask existing failure sources in the program under analysis. A related side-effect arises from the need to hold off maskable processor interrupts whenever the program image is being modified. Typically, these interrupts must remain disabled for the duration of the trace point handling to ensure that the integrity of the modified image, including the trace point modification, is maintained.

The addition of the trace break instruction handling and data collection routines, and the allocation of a typically large data collection buffer, can create a substantial space intrusion on the program under analysis. These increased memory requirements typically reduce the available system resources to the program under analysis. This, in turn may cause other performance related side-effects, such as a more frequent need to re-allocate available memory resources. Space intrusions may also produce relocations in different parts of the program under analysis, which may then mask or alter the occurrence of certain failure sources, such as pointer overruns.

Performance and space intrusions both operate to directly and unpredictably alter the system behavior of the program under analysis relative to the handling of ordinary event and task processing. Such changes in system behavior, even if they appear superficially minor in nature, are recognized in the art as potentially, if not likely, to create or greatly distort the occurrence of failure sources in the program under analysis. Consequently, trace analysis of the program under analysis will produce an inaccurate picture of the performance of the program in its nominal operating environment.

SUMMARY OF THE INVENTION

Thus, a general purpose of the present invention is to provide an efficient mechanism and method of instrumenting program code for the collection of event related data, and for the effective, efficient presentation of such event data.

This is achieved in the present invention by providing for the dynamic instrumentation of program code loaded for execution by a computer to collect event data. Dynamic instrumentation is performed by inserting, on demand to initiate tracing of events, an instruction at a trace point within the program code as loaded in a memory space of a computer, where the trace point corresponds to the beginning of a predefined function of the program selected for event tracing. The instruction provides for the direction of the execution of said computer to a function proxy routine, which includes a call to an instance of the predefined function. Event data is collected in connection with the calling of the instance of the predefined function.

An advantage of the present invention is that the system and methods support a dynamic instrumentation of an executing or executable program. Application programs, shared libraries, operating system kernels and device drivers can all be dynamically instrumented with no advance preparation or modification of the target program. The system and methods of the present invention do not require trace specific instrumentation code to be added to the program or operating system, which allows tracing of binary-only code.

Another advantage of the present invention is that the system and methods of the present invention are not specific to a proprietary program or useable in only a proprietary environment. Essentially any executable program can be traced provided that the trace point addresses of functions within the program are known.

A further advantage of the present invention is that the instrumentation of program code performed according to the present invention imposes only a minimal performance impact on the target program. Furthermore, the applied instrumentation does not involve or interfere with the nominal exception handling by or on behalf of the program. There is no required modification of the interrupt handling functions of the program under analysis or of any underlying operating system. Consequently, there is no fundamental and persistent affect on system behavior to simply enable tracing in accordance with the present invention.

Still another advantage of the present invention is that event data is strategically captured and displayed to maximize the discriminating detection and intelligent analysis of event data. In accordance with the present invention, event data is selectively captured in multiple event logs and displayed using a scalable presentation system using pop-up notations of detailed information, color, and positional representation of information to convey event data. A system of intelligent line item event search and zoom is supported.

Yet another advantage of the present invention is that custom event types can be defined as needed to capture event data. A custom library of event type data collection routines can be incorporated into the system and methods of the present invention to allow custom event-specific data to be collected.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Figure 1:
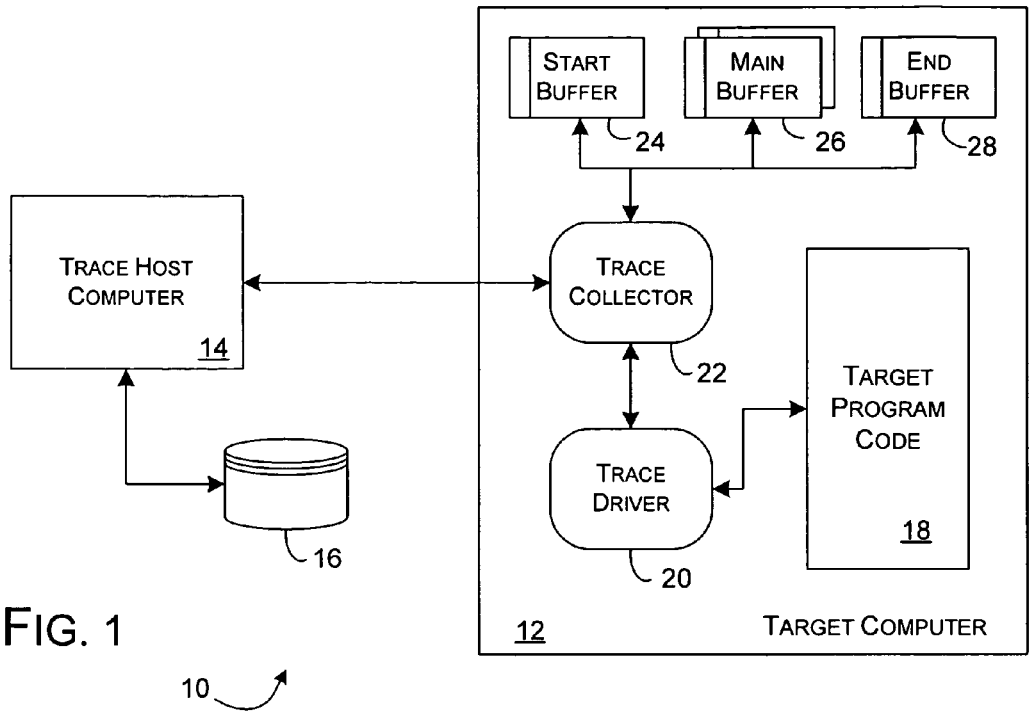
FIG. 1 is a block diagram of an implementation of the trace analysis environment according to a preferred embodiment of the present invention.

As generally shown in FIG. 1, the present invention provides a trace environment 10 to capture event data suitable for tracing the executing state of a target program. A target computer 12 is monitored and managed with respect to the collection of trace data by a trace host computer 14, and event trace data received thereby may be stored in a persistent data file 16 for subsequent review and analysis. For a preferred embodiment of the present invention, the target computer 12 can be a general purpose personal computer or an embedded, proprietary process control computer system executing a generic Linux™ or proprietary LynxOS™ operating system and supporting a conventional network interconnection. The trace host computer 14 is preferably a network capable conventional personal computer or workstation supporting Java 2 applications.

In general, a target program 18 executes on the target computer 12 along with a trace driver 20 that performs the detailed management of trace points established in the target program to define the collection of detailed trace data. A trace data collector 22 is also preferably executed by the target computer. The trace data collector 22 preferably executes as a background daemon or similar ancillary process to buffer trace data, as provided from the trace driver 20, into an appropriate start buffer 24, main buffer 26, or end buffer 28. In the preferred embodiments of the present invention, the trace data collector 22 also operates to process commands communicated from the trace host computer 14 over the network connection to configure the trace driver 20 and size the buffers 24, 26, 28, to enable and disable the collection of trace data during the execution of the target program 18, and to return trace data from the buffers 24, 26, 28 and other collected statistics to the trace host computer 14.

In a preferred embodiment of the present invention, the trace host computer 14 executes a control program (not shown) that implements an event display that provides a visual representation of the trace data collected and transferred to the trace host computer 14 or as stored by the persistent data file 16. This control program also preferably enables the user of the control program to define the parameters of operation of the trace driver 20.

Figure 2:
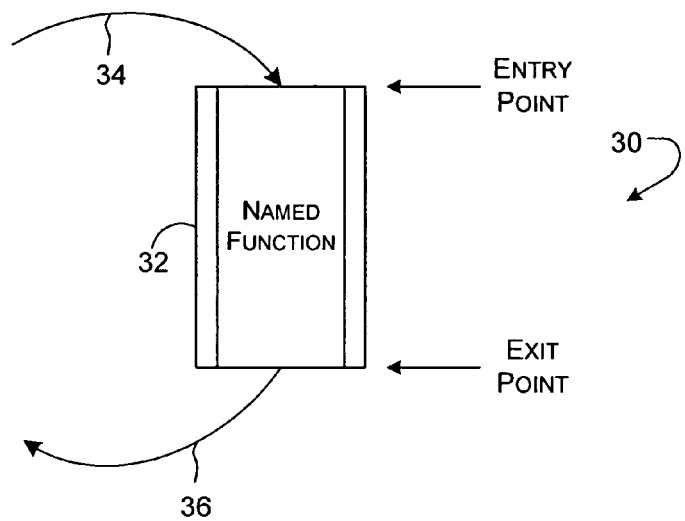
FIG. 2 is an illustration of a conventional named routine within a target program.
Figure 3:
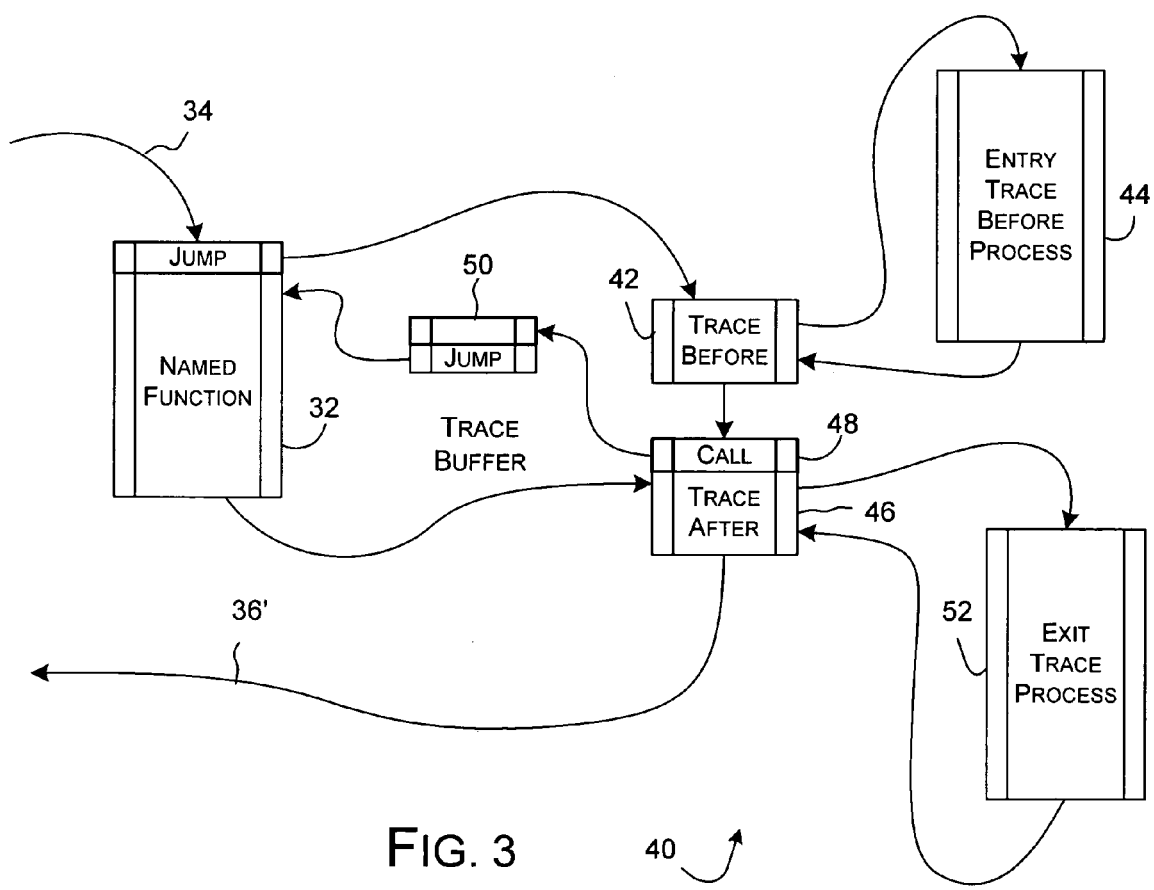
FIG. 3 is an illustration of a named routine instrumented in accordance with a preferred embodiment of the present invention.

For purposes of the present invention, events giving rise to trace data correspond to the call and return from execution of named routines or functions within the target program. Where the target program executes as an application of a control program, such as an operating system, or in concert with other co-executing applications, at least the event instrumented portions of these other programs is considered part of the target program for purposes of analysis. As generally shown in FIG. 2, a routine 30 conventionally includes a named function 32 having a callable 34 entry point and returns from an exit point 36. Instrumentation of the routine 30, in accordance with a preferred embodiment of the present invention, is shown in FIG. 3. The instrumentation can be performed statically or dynamically through the insertion of a deterministic branch instruction, preferably an unconditional jump instruction, at the named function entry point to transfer execution control to an entry trace data collection control routine 42. Deterministic branch instructions, including unconditional jumps, jump relative, jump offset, and calls, are distinguished from break instructions, which do not intrinsically provide a branch target address. Execution of a break instruction is typically handled as an interrupt, requiring the processor to save processor context state and execute an interrupt handling routine to evaluate the interrupt source and dispatch execution to an appropriate target address after restoring state. Such interrupt related operations are costly in terms of execution time and can introduce significant changes in the system behavior of the executing program and underlying computer system. Deterministic branch instructions, however, are resolved entirely in the processor without requiring any context state saves or execution of additional program code.

Static insertion of the deterministic branch instruction is performed by compile-time placement of a jump instruction in the source code of the target program to the entry point of a preselected entry trace data collection control routine 42. Dynamic insertion, which is the preferred operating mode, provides for the dynamic generation and insertion of a binary value defining a jump to destination address corresponding to the entry point of the entry trace data collection control routine 42.

The entry trace data collection control routine 42 preferably functions to determine whether trace data collection is enabled and evaluates any constraints on the data to be collected. These constraints may include event identification triggers to start or stop the actual collection of data, filter-based limitations on the category or type of event that is enabled and parameters that qualify the form or extent of different types of event data that is to be collected, such as whether a variable-length extended event descriptive payload is to be collected on a per event basis. Provided that trace data is to be collected, the entry trace data collection control routine 42 calls for the execution of an entry-trace process 44 to collect detailed trace data for the current event. In the preferred embodiment of the present invention, a trace data entry structure is defined in Table 1.

TABLE 1

Trace Data Entry Structure

| Data | Description |
|---|---|
| CPU | CPU ID and status flags (user/system event) |
| Payload size | Size of payload |
| Event Number | event identifier |
| Current Super PID | combined process and thread Ids |
| Timestamp | high-resolution timestamp value |
| Short Payload | small, 4-byte payload |
| Payload | variable size payload, dependent on event type |

The entry trace data collection control routine 42 preferably passes control to an exit trace data collection control routine 46. A call 48 is performed as an initial action of the exit trace data collection control routine 46 to ultimately perform the action of the named function 32. Preferably, the instruction or instructions overwritten by the dynamic insertion of the jump instruction at the entry point of the named function 32 are preserved in a trace code buffer 50. Another jump instruction is dynamically generated and appended to these preserved instructions to return execution control to the named function 32 on the instruction boundary following the inserted jump instruction.

The return instruction at the exit point of the named function 32 will return control to the exit trace data collection control routine 46 at the instruction address following the call 48. Like the entry trace data collection control routine 42, the exit trace data collection control routine 46 determines whether exit trace data collection is enabled and evaluates any constraints on the data to be collected. As appropriate, an exit trace process 52 is invoked to perform the trace data collection for the current event. The exit trace data collection control routine 46 ends with a return instruction that operates as a return 36' from the call 34 to the named function 32.

Figure 4:
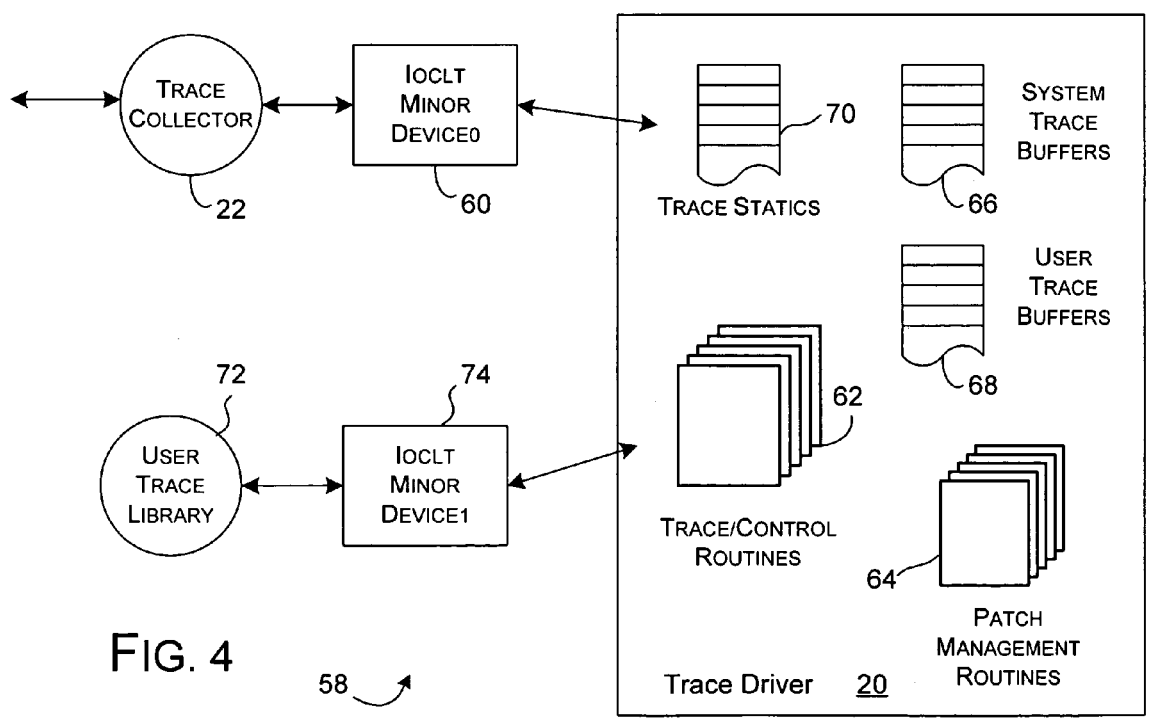
FIG. 4 provides a block diagram of an implementation of the trace driver according to a preferred embodiment of the present invention.

The trace driver 20 is shown in greater detail in FIG. 4. In the preferred embodiments of the present invention, particularly where the target program 18 is an operating system, the trace driver 20 is implemented as a dynamically installable device driver, permitting installation in pre-existing and actively executing systems. Linux and LynxOS operating systems support dynamic loading and linking of device drivers. Where dynamic installation of the trace driver 20 is not supported or desired, the target program can be statically linked with the trace driver 20. In both cases, the trace driver 20 preferably implements a conventional device driver type (IOCLT( )) interface 60 that is then accessible by the trace collector 22 for the transfer of commands and control information.

The trace driver preferably includes trace control routines 62, patch management routines 64, trace buffers 66, 68, and a trace statics list 70. The trace control routines provide a programmable interface for controlling the configuration and operation of the trace driver 20, including starting and stopping the trace process, setting trace start and stop trigger event types and values, and filter specifications for the events to be traced. The trace control routines 62 also include the entry and exit trace data collection control routines 42, 46 and the entry and exit trace process routines 44, 52. Patch management routines 64 supports the dynamic instrumentation patching and un-patching of the program under analysis, including the computation of jump target addresses and instruction offsets. Where the processor implemented by the target computer 12 supports variable length instructions, the patch management routines 64 preferably includes a basic instruction disassembler routine capable of identifying the lengths and types of the instructions that occur at the nominal entry point of named functions 32, as appropriate to identify the instruction or group of instructions that need to be copied to a trace code buffer 50, which is dynamically allocated within the address space of the trace driver, to preserve the execution integrity of the named function 32 when instrumented in accordance with the present invention.

Trace data buffers 66, 68 provide temporary event data storage space, pending transfer of the event data by the trace collector 22 to an appropriate buffer 24, 26, 28. In the preferred embodiments of the present invention, the trace data buffers 66, 68 are mapped into the address space of the trace collector to simplify and speed event data transfers. Also, in the preferred embodiments where both high and low frequency events are instrumented for tracing, such as where a user program and underlying operating system are instrumented for the collection of event data, the trace data buffers 66, 68 are separately used to collect user and system trace data.

Finally, the trace statics list 70 is provided to maintain a current list of the named function entry points that are to be instrumented when tracing is enabled. The statics list 70 is thus a resource used by the patch management routines 64 to identify the patch point locations and to correlate the trace code buffers 50 with corresponding named functions 32 to support dynamic removal of instrumentation while maintaining the execution integrity of the named functions 32.

Where the target program 18 is a user program, application, or shared library, instrumentation is preferably performed by inclusion of a user trace library 72 in the target program 18 to provide access to the trace driver 20. Since conventional user programs and the like do not support dynamic linking, the user trace library 72 is typically statically linked to a user program, preferably as a component of a standard shared library. The user trace library 72 preferably contains a set of routines that implement an interface, through a secondary device driver IOCLT interface 74, to the trace driver 20. In a preferred embodiment these routines implement only a thin interface, permitting hard coded trace statements to be inserted into the source code of the user program to call the trace control routines 62 through the secondary IOCLT interface 72. Alternately, the user trace library 72 may implement or call portions of the trace driver 20 sufficient to perform dynamic instrumentation of the user program, when directed by the trace collector 22 through the secondary IOCLT interface 72.

Figures 5, 6:
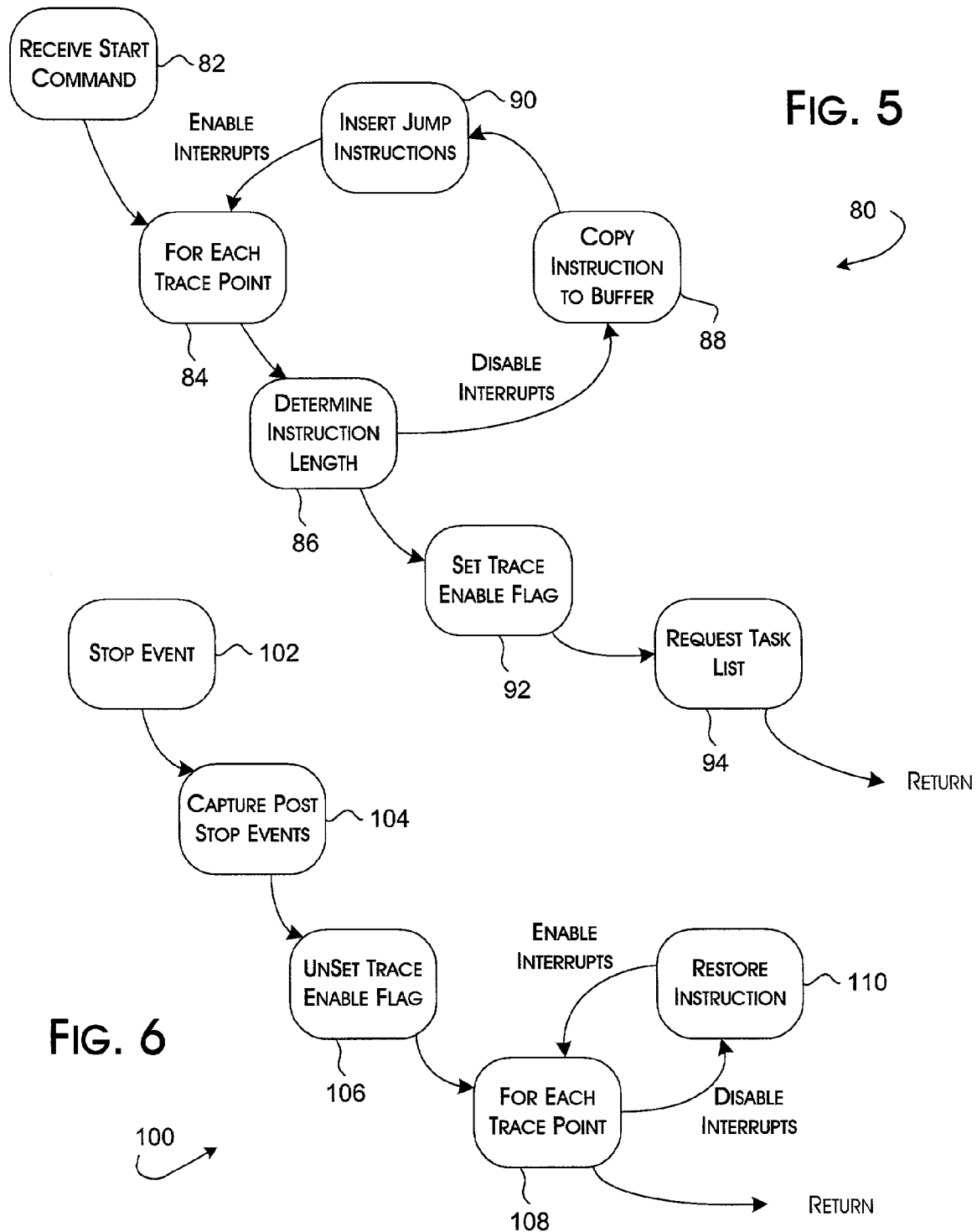
FIG. 5 is a flow diagram of a trace point patch application process implemented in a preferred embodiment of the present invention.
FIG. 6 is a flow diagram of a trace point patch removal process implemented in a preferred embodiment of the present invention.

A preferred process flow 80 for dynamic instrumentation of the target program 18 is shown in FIG. 5. The trace driver 20, typically in response to a start command 82 issued through the trace collector 22, dynamically instruments the selected named routines in the target program 18. In response to the start command 82, the patch management routines 64 are called to process the list of currently selected named routines for instrumentation as maintained in the statics list 70. For each named routine identified 84, space at the entry point of the named routine is cleared by copying one or more instructions to an available trace buffer 50. Where the instruction length of the processor used by the host computer 12 is fixed, a single instruction is moved to allow the single instrumentation jump instruction to be installed. Where instruction lengths are variable, a limited decoding 86 of the instructions at the entry point is performed to determine actual instruction lengths. A sufficient number of instructions are then copied 88 to the trace buffer 50 to provide room at the entry point for installation of the instrumentation jump instruction. In both cases, a second jump instruction is provided 90 at the end of the trace buffer 50 with a jump destination address targeted to the first instruction in the named function 32 following the instruction or instructions copied out to the trace buffer 50, which is calculated based on the number and length of instructions copied out. As indicated, interrupts are disabled only for each short period where the execution integrity of a named routine might be compromised. Thus, the periods where interrupts are disabled are both short and distributed over the total period required to instrument a target program 18.

Once all of the named routines selected or otherwise identified for trace data collection are instrumented, a global trace enable flag may be set in the trace driver 20. The entry and exit trace data collection control routines 42, 46 test this trace enable flag on each execution of the routines 42, 46. At a minimum, provision of the trace enable flag allows event data collection at the trace points to be discretely held off until after instrumentation installation in the target program 18 is complete. Also, where an unconditional start command is received from the trace collector 22, the trace enable flag can be set immediately 92. Finally, an operating system request 94 is preferably then made to the operating system to retrieve a list of the currently executing processes. The resultant list provides data reportable in connection with trace events, as well as an identification of the context names within which events are recorded.

A preferred instrumentation removal process 100 is shown in FIG. 6. In accordance with a preferred embodiment of the present invention, a stop event 102 signals the trace driver 20 to terminate the collection of event data and remove dynamically applied instrumentation from the target program 18. The stop event 102 may occur as either an unconditional stop command received via the trace collector 22, or the conditional occurrence of a trigger event preprogrammed by commands received by the trace driver 20. Whether conditional or unconditional, the stop event 102 preferably forces a switch of collected trace data to the end buffer 28, which permits collection of a limited amount of post stop event trace data 104. When the end buffer 28 is full, the trace enable flag is reset 106. The instrumentation code dynamically installed is then removed from the target program 18 by selecting each trace point 108 and restoring 110 the entry point instructions previously copied to the corresponding trace buffers 50. As before, interrupts are disabled only for each short period where the execution integrity of a named routine might be compromised.

Figure 7:
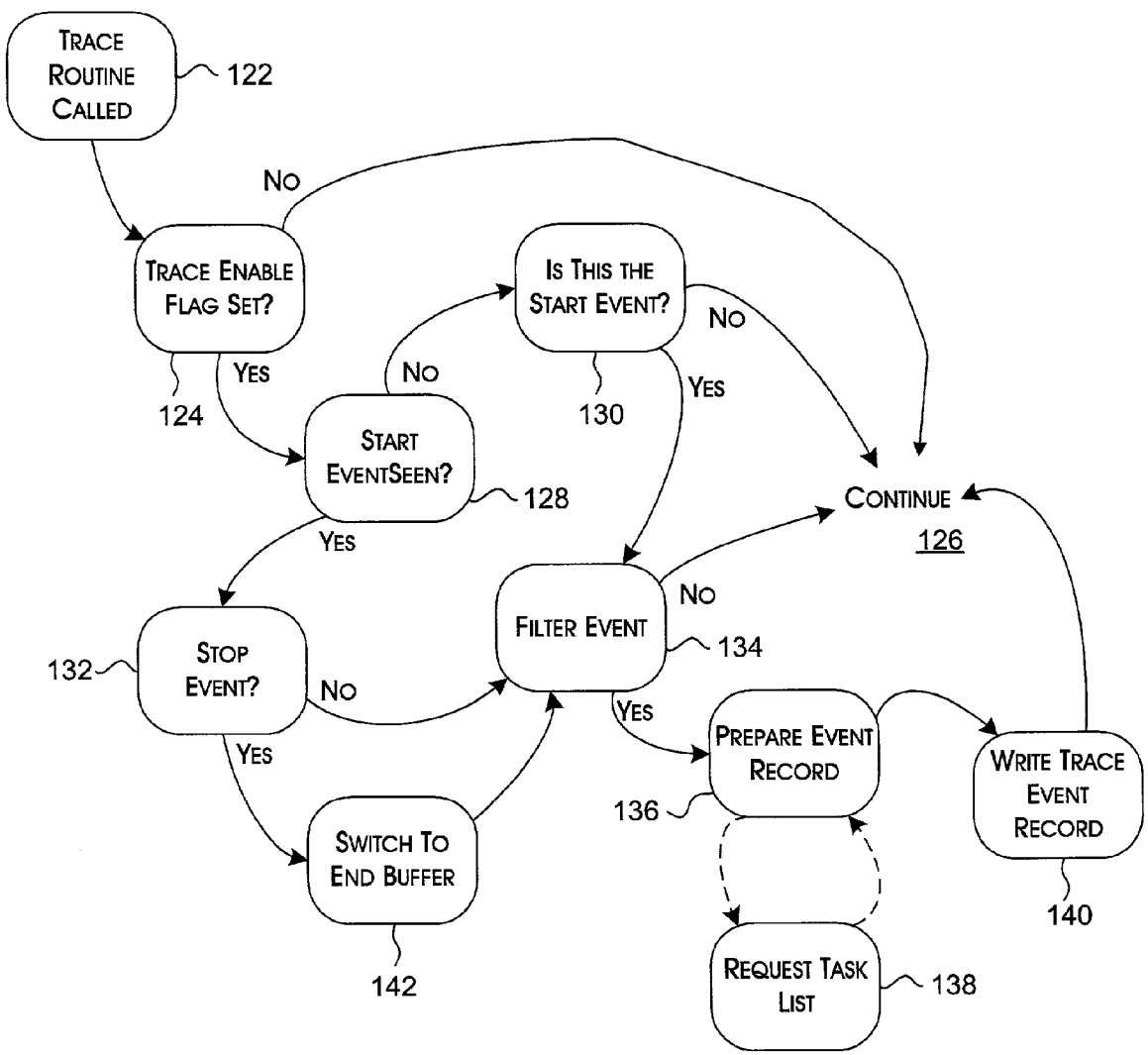
FIG. 7 is a flow diagram of a trace point data collection control process implemented in a preferred embodiment of the present invention.

The collection of event data occurs selectively through the execution of the entry and exit trace data collection control routines 42, 46, and the associated entry and exit-trace processes 44, 52. The combined entry 42, 44 and exit 46, 52 routines implement essentially the same trace process flow 120, as shown in FIG. 7. Whenever the trace process flow 120 is called 122, whether through a call of a named function 34 or directly from a user library call, the trace enable flag is tested 124. If the flag is not set, execution continues 126 with execution of the call instruction 48, in the case of the entry trace routine 42, and a call return, from the exit trace routine 46.

Where tracing is enabled, the trace process flow 120 determines whether a start trigger event has been defined and, if so, whether the event has been seen 128. In the preferred embodiments of the present invention, a start trigger event may be defined to the trace driver 20 as the execution call of a specific named function, potentially with defined call data value or arguments. Preferably, the trigger event is defined by command data passed from the trace collector 22 identifying the event and event parameter comparisons necessary to identify a first occurrence of the triggering event. If the trigger event has not been previously detected 128, each event call is examined for the potential occurrence of the start trigger event. Detection 130 of the start trigger event occurs only when the defined named function is called with the matching call data arguments. An event start flag is then set. A stop trigger event may also be defined to the trace driver 20. Occurrence of the stop trigger event, if defined, is checked 132 only after a start trigger event, if defined, has been detected. The recording of event data is switched to the end buffer 28 when a stop trigger event is detected.

The trace process flow 120 then determines whether the trace data is to be collected for the current event. An event filter 134 is provided to screen for events matching criteria defined to the trace driver 20. As with the trigger events, the filter criteria is preferably provided by command data passed from the trace collector 22. In a preferred embodiment of the present invention, the filter criteria is based on the name of commonly instrumented operating system functions. A filter data structure is maintained by the trace driver 20 identifying the filterable events and a flag defining whether trace data collection is to be performed for the corresponding event. Additional event identifications can be added to the filter data structure to enable selective filtering. Table 2 lists the filter events selectable in connection with a preferred embodiment of the present invention.

TABLE 2

| Event Number | Event Description | Payloads Short | Payloads Long |
|---|---|---|---|
| 0 | Context Switch | Superpid1 | N/A |
| 1 | System Call | System call # | N/A |
| 2 | Interrupt | Interrupt # | N/A |
| 3 | Return from interrupt | Interrupt # | N/A |
| 4 | Processor exception | Exception # | N/A |
| 5 | Thread stop | N/A | N/A |
| 6 | Program load | Parent process' superpid | Name of program loaded |
| 7 | Thread wait | N/A | N/A |
| 8 | Thread wakeup | Superpid of thread being awakened | N/A |
| 9 | Process exit | N/A | N/A |
| 10 | User thread exit | N/A | N/A |
| 11 | System thread exit | Thread id | N/A |
| 12 | Return from system call | System call return value | System call # |
| 13 | Signal delivery (caught) | Signal # | N/A |
| 14 | Signal delivery (not caught) | Signal # | N/A |
| 15 | Memory allocation | # of pages requested | Current # of free pages (before allocation) |
| 16 | Memory free | # of pages being freed | Current # of free pages (before free) |
| 17 | malloc | # of bytes requested | Return value |
| 18 | Kernel free | # of bytes freed | Address of memory |
| 19 | New system thread | New thread id | Thread name |
| 20 | New user thread | Superpid of new thread | N/A |
| 21 | New process (fork) | Superpid of new process | N/A |

TABLE 2-continued

| Event Number | Event Description | Payloads Short | Payloads Long |
|---|---|---|---|
| 22 | Trace start3 | N/A | N/A |
| 23 | Existing process4 | N/A | N/A |
| 24 | Existing thread5 | N/A | N/A |
| 25 | Unknown event | Unrecognized event type # | N/A |
| 26 | Reserved 26 | N/A | N/A |
| 27 | Reserved 27 | N/A | N/A |
| 28 | Reserved 28 | N/A | N/A |
| 29 | Reserved 29 | N/A | N/A |
| 30 | Reserved 30 | N/A | N/A |
| 31 | POSIX Message Send | Message queue id | Message size (in bytes) |
| 32 | POSIX Message receive | Message queue id | Message size (in bytes) |
| 33 | Mutex enter | pthreads mutex id | N/A |
| 34 | Mutex exit | pthreads mutex id | N/A |
| 35 | Condition wait | pthreads condition variable id | N/A |
| 36 | Condition signal | pthreads condition variable id | N/A |
| 37 | User 37 | Undefined | Undefined |
| 38 | User 38 | Undefined | Undefined |
| 39 | User 39 | Undefined | Undefined |
| 40 | User 40 | Undefined | Undefined |
| 41 | User 41 | Undefined | Undefined |
| 42 | User 42 | Undefined | Undefined |
| 43 | User 43 | Undefined | Undefined |
| 44 | User 44 | Undefined | Undefined |
| 45 | User 45 | Undefined | Undefined |

Thus, on occurrence of any particular traceable event, a filtering match 134 is performed to select out a subset for which trace data is not to be collected. Where trace data is not to be collected for a filter identified event, the trace process flow 120 continues 126. Alternatively, the trace process flow 120 proceeds to prepare an event record 136 corresponding to the type of the current event. In a preferred embodiment of the present invention, the event filter data structure additionally identifies the particular entry and exit trace processes 44, 52 to use for each event type to collect and record trace event data. User-defined trace data collection routines are associated with user-defined events through the event filter data structure. Where the trace data collected corresponds to a process or context not previously identified, an operating system request may be made to update the current task list 138. Finally, the collected trace data is written 140 to the current trace data buffer 24, 26, 28. The trace process flow 120 then continues 126.

Figure 8:
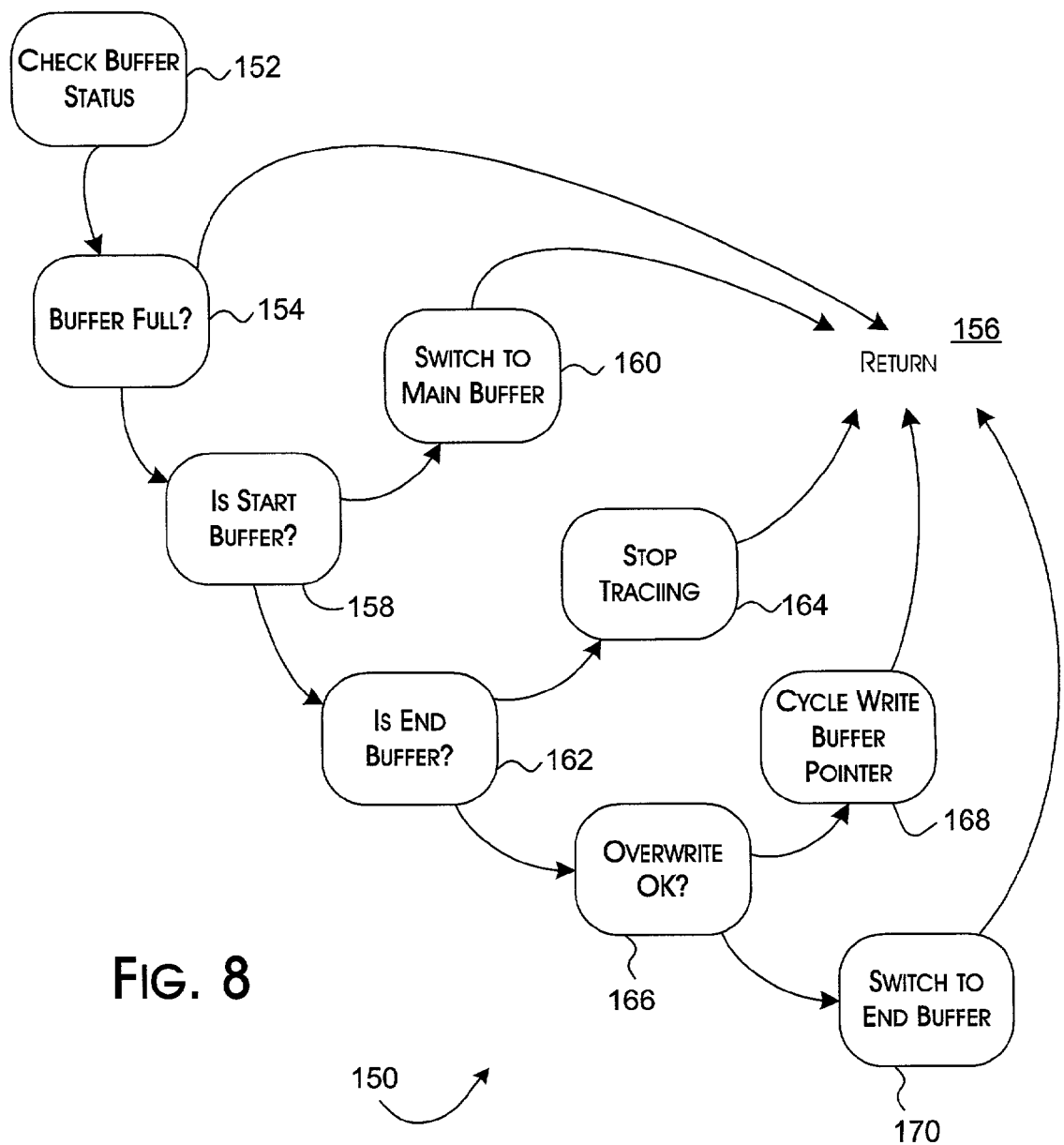
FIG. 8 is a flow diagram of a trace buffer management process implemented in a preferred embodiment of the present invention.

In preferred embodiments of the present invention, management of the trace data buffers 24, 26, 28 occurs in preparation of each write of trace data to the buffers. A buffer management flow 150, as shown in FIG. 8, is invoked in anticipation of each write of trace data to the buffers 24, 26, 28. The management flow 150 initially checks 152 the status of the currently active buffer 24, 26, 28. If the current buffer is not full 154, a return 156 from the management flow 150 is executed. Conversely, if the current buffer is full, the management flow 150 determines if the current buffer is the start buffer 158 and executes a switch of the active buffer to the main buffer 26. If the active buffer is determined 162 to be the end buffer 28, the trace enable flag is reset to stop further event tracing 164.

The remaining alternative is that the current active buffer is the main buffer. A test is performed 166 to determine whether the main buffer is permitted to be cyclically overwritten with event data. Where cyclic use is permitted, the event write data pointers are updated accordingly 168. Otherwise, the current active buffer is switched 170 to the end buffer 18 for recording trace event write data.

Thus, a method for providing for the dynamic instrumentation of program code has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A system providing for dynamic instrumentation and event data collection with respect to a target program as executed by a target computer, said system comprising:
 a) a target data collection routine including a data collection buffer and wherein said target data collection routine is responsive to calls to store event data in said data collection buffer; and
 b) a target driver including a trace control routine and an instrumentation routine, wherein execution of said instrumentation routine by said target computer subsequent to the loading and initial execution of said target program dynamically installs a deterministic program execution redirection instruction with respect to a named function of said target program to redirect execution of said target program by said target computer to said trace control routine, said instrumentation routine providing for the dynamic location and decoding of said named function to enable dynamic installation of said deterministic program execution redirection instruction, wherein execution of said instrumentation routine further provides, in response to a predetermined input signal provided to said target driver, for the dynamic removal of said deterministic program execution redirection instruction whereby said named function is restored to a non-instrumented state, wherein said instrumentation routine preserves an instance of said named function, wherein said trace control routine supports the collection and transfer of event data to said target data collection routine, and wherein execution of said trace control routine includes execution of said instance of said named function.

2. The system of claim 1 wherein said target driver is loaded for execution by said target computer separate from said target program, and wherein said system comprises a call interface layer associated by said system with said target program through which execution between said target program and said target driver is passed, whereby the execution space of said target program is minimally increased while allowing full instrumentation functionality to be implemented.

3. The system of claim 2 wherein said trace control routine selectively determines whether to collect event data with respect to said named function.

4. The system of claim 3 further comprising a remote host system coupled to said target driver to enable execution of said instrumentation routine and to said target data collection routine to retrieve event data from said data collection buffer.

5. The system of claim 4 wherein said target driver is responsive to said remote host system for enabling and disabling the collection of event data.

6. A method of dynamically instrumenting executable program code provided in the memory of a computer system, said method comprising the steps of:
 a) dynamically provisioning a sequence of executable program code in response to a predetermined user input, wherein said sequence of executable program code is part of an executable program and wherein said step of dynamically provisioning is performed after initiation of execution of said executable program within the memory of said computer system, said dynamically provisioning including
  i) enabling the interception of execution of said sequence through insertion of a deterministic branch instruction at a predetermined location within said sequence; and
  ii) restoring said sequence by removal of said deterministic branch instruction from said predetermined location; and
 b) executing an event capture routine in response to interception of said sequence, wherein execution of said event capture routine enables execution of said sequence and selectively enables execution of a data collection routine to record data associated with execution of said sequence.

7. The method of claim 6 wherein said step of dynamically provisioning provides for the copying of a first sequence instruction from said sequence to an executable buffer and placement of a first deterministic branch instruction in said sequence, said method further comprising the step of providing a second deterministic branch instruction following said sequence instruction in said executable buffer, wherein said second deterministic branch instruction identifies the address of a second sequence instruction in said sequence.

8. The method of claim 7 wherein said event capture routine provides for the execution of said sequence by execution of a third deterministic branch instruction that identifies the address of said first sequence instruction as provided in said executable buffer.

9. The method of claim 8 wherein said third deterministic branch instruction is a call-type branch instruction and wherein said first sequence instruction is copied from an entry point of said sequence.

10. The method of claim 9 wherein execution of said event capture routine further selectively enables execution of said data collection routine before and after execution of said sequence.

11. The method of claim 10 wherein execution of said event capture routine selectively enables execution of said data collection routine before execution of said sequence independently of selectively enabling execution of said data collection routine after execution of said sequence.

12. A diagnostic system supporting dynamic instrumentation of a target program executing within the memory of a computer system, said diagnostic system comprising:
 a) a buffer providing for the storage of execution trace data reflective of the occurrence of traceable events within the execution of said target program; and
 b) a trace program provided and concurrently executable within the memory of said computer system, said trace program including
  i) a list of addresses within said target program designated as the source of traceable events;
  ii) a trace data collection routine executable to selectively capture and provide trace data to said buffer;
  iii) a dynamic patch routine executable to dynamically instrument said target program at each address of said list by establishing respective deterministic execution paths through said addresses that provide for execution of said trace data collection routine, wherein said dynamic patch routine includes a patch management routine that supports an instrumenting of said target program at a predetermined address subsequent to loading and initial execution of said target program by said computer system, and wherein said patch management routine is responsive to user provided trace commands issued with respect to said predetermined address to selectively apply and remove said instrumenting of said target program at said predetermined address; and wherein trace data is collected through a deterministic flow of execution through said target program with minimal impact on the system behavior of said target program and said computer system.

13. The diagnostic system of claim 12 wherein said trace data collection routine includes a plurality of event-type specific data collection routines and wherein said dynamic patch routine provides for the selective execution of said event-type specific data collection routines for each said respective execution path established through said trace data collection routine.

14. The diagnostic system of claim 13 wherein execution of said event-type specific data collection routines provides for a programmable level of collection of event-type specific data and for creation of a corresponding data record storable by said buffer.

15. The diagnostic system of claim 14 further comprising a monitor program provided and concurrently executable within the memory of said computer system, said monitor program being coupled to said computer system to receive first messages providing said list of addresses and directing the retrieval of execution trace data from said buffer.

16. The diagnostic system of claim 15 wherein said trace program is coupled to said monitor program to receive second messages directing the execution of said dynamic patch routine, and the enabling of said trace data collection routine.

17. The diagnostic system of claim 16 wherein said monitor program is further coupled to receive said first and second messages from a remote host computer system and to return data stored by said buffer for examination and analysis by said remote host computer.

18. The diagnostic system of claim 12 wherein said addresses correspond to the entry points of executable subroutines of said target program and wherein each said deterministic execution path is dynamically established by placing a first instruction of an executable subroutine in an executable buffer, placing a deterministic branch instruction at the entry point of said executable subroutine with a target address of said trace data collection routine, and placing a deterministic branch instruction following said first instruction in said executable buffer with a target address of a second instruction of said executable subroutine.

19. The diagnostic system of claim 18 wherein said trace data collection routine includes a call-type branch instruction with a target address of said first instruction as stored in said executable buffer.

* * * * *